United States Patent
Watanabe et al.

(10) Patent No.: US 8,177,643 B2
(45) Date of Patent: May 15, 2012

(54) OUT-OF-BAND VOICE COMMUNICATION WITH INTERACTIVE VOICE RESPONSE SERVICES DURING GAMEPLAY

(75) Inventors: Yuzo Watanabe, San Francisco, CA (US); Morgan Springer, San Francisco, CA (US)

(73) Assignee: Microsoft Corporation, Redmond, WA (US)

(*) Notice: Subject to any disclaimer, the term of this patent is extended or adjusted under 35 U.S.C. 154(b) by 627 days.

(21) Appl. No.: 12/328,776

(22) Filed: Dec. 5, 2008

(65) Prior Publication Data

US 2010/0144439 A1 Jun. 10, 2010

(51) Int. Cl.
*A63F 9/24* (2006.01)
(52) U.S. Cl. ............... 463/40; 463/43; 709/205
(58) Field of Classification Search .......... 709/205; 463/40, 43
See application file for complete search history.

(56) References Cited

U.S. PATENT DOCUMENTS

| | | |
|---|---|---|
| 2002/0174177 A1 | 11/2002 | Miesen et al. |
| 2005/0135573 A1 | 6/2005 | Harwood et al. |
| 2005/0169252 A1* | 8/2005 | Riggs ............... 370/352 |
| 2006/0178209 A1 | 8/2006 | Shultz |
| 2007/0021205 A1 | 1/2007 | Filer et al. |
| 2007/0099703 A1 | 5/2007 | Terebilo |
| 2007/0118662 A1 | 5/2007 | Vishwanathan et al. |
| 2007/0207857 A1 | 9/2007 | Angell et al. |
| 2010/0069154 A1* | 3/2010 | Claussen ............... 463/37 |

OTHER PUBLICATIONS

"Voice Connector 3.1.1", Retrieved at <<http://www.softpedia.com/get/Internet/Chat/LAN-Messaging-Clients/Voice-Connector.shtml>>, Sep. 30, 2008, pp. 3.
"In-Game and in-World Voice Services", Retrieved at <<http://www-304.ibm.com/jct03004c/businesscenter/smb/us/en/solutionsummary/xmlid/83142/>>, Sep. 30, 2008, p. 1.
"EVE Online(R) Screams with Vivox Real-Time Voice Technology", Retrieved at <<http://www.thefreelibrary.com/EVE+Online(R)+Screams+with+Vivox+Real-Time+Voice+Technology.-a0145560934>>, Sep. 30, 2008, pp. 3.

* cited by examiner

*Primary Examiner* — Mohamed Wasel
(74) *Attorney, Agent, or Firm* — Hope Baldauff Hartman, LLC

(57) ABSTRACT

While executing a game program, a game console determines that a user wishes to issue a voice command through a headset or other audio input/output device connected to the console. The game console switches the communication channel for the audio input/output device from the game program to a voice recognition engine without interrupting the execution of the game program on the console. The voice command is then forwarded from the audio input/output device to the voice recognition engine.

20 Claims, 3 Drawing Sheets

OUT-OF-BAND VOICE COMMUNICATION WITH INTERACTIVE VOICE RESPONSE SERVICES DURING GAMEPLAY

BACKGROUND

The game console has evolved beyond being simply a special purposed computer on which to play games. A game console may act as a media hub in the living room, allowing access to music, TV, videos, and movies from mass storage devices, other computers on a home LAN, or media sources over the Internet. The game console may also provide a portal to information, social networking, and commerce through a connection to the Internet. These features and services may be made available to a user of the game console through interfaces built into the console's operating system and available upon initial startup.

However, traditionally once a game is loaded, the game program takes control of the game console, and the media features and online services may not be available to the user during gameplay. Even if these features and services are available during gameplay through an interface provided by the game console or game program, the user will often be required to pause or exit an ongoing game, or turn attention away from the game controls in order to interact with the provided interface. Many of the most popular games available for these game consoles offer fast-paced action and require all fingers on the controls and constant attention to avoid defeat or virtual death. Consequently, the media features and online services of many game consoles often go unutilized during gameplay.

It is with respect to these considerations and others that the disclosure made herein is presented.

SUMMARY

Technologies are described herein for providing out-of-band voice communication with interactive voice response services from a game console during gameplay. While executing a game program, a game console determines that a user wishes to issue a voice command through a headset or other audio input/output device connected to the console. The game console may determine the user wishes to issue a voice command by detecting a button press on a game controller or key press on a keyboard connected to the console.

Upon determining that the user wishes to issue a voice command, the game console switches the communication channel for the audio input/output device from the game program to a voice recognition engine without interrupting the execution of the game program on the console. The voice recognition engine may be internal to the game console or may be an external voice recognition server accessed via a network. The voice command from the audio input/output device is then forwarded over the communication channel to the voice recognition engine, which recognizes the command and executes a function associated with the command. Upon completion of the execution of the function associated with the command, the game console switches the communication channel for the audio input/output device back to the game program.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
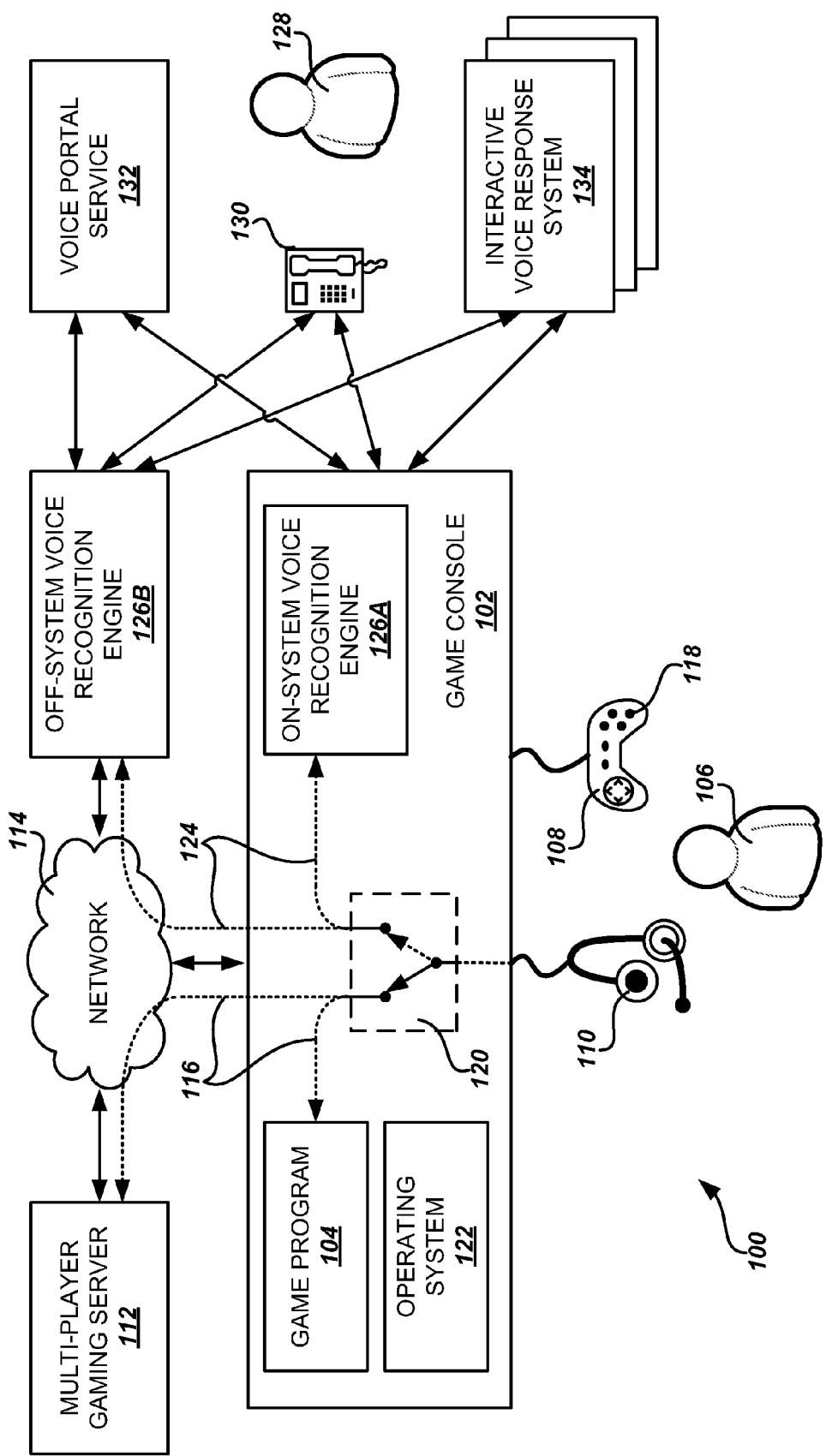
FIG. 1 is a block diagram showing aspects of an illustrative operating environment and several software components provided by the embodiments presented herein.

The following detailed description is directed to technologies for providing out-of-band voice communication with interactive voice response services from a game console during gameplay. Utilizing the technologies described herein, a user of a game console, personal computer, or other device may access media features of the device and online service functionality without exiting from or pausing an ongoing game. The user may access these features and services via out-of-band voice communication through a headset or other audio input/output device with a voice recognition engine. By accessing and controlling these features and services with voice commands, the user may continue to utilize the game console's primary controls for gameplay as well as remain focused on the action of the ongoing game.

While the subject matter described herein is presented in the general context of program modules that execute in conjunction with the execution of an operating system and application programs on a computer system, those skilled in the art will recognize that other implementations may be performed in combination with other types of program modules. Generally, program modules include routine, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and that show, by way of illustration, specific embodiments or examples. Referring now to the drawings, in which like numerals represent like elements through the several figures, aspects of a methodology for providing out-of-band voice communication with interactive voice response services during gameplay will be presented.

Turning now to FIG. 1, details will be provided regarding an illustrative operating environment and several software components provided by the embodiments presented herein. FIG. 1 illustrates an exemplary system 100 for providing out-of-band voice communication with interactive voice response services during gameplay. The system 100 includes a game console 102. The game console 102 may be a special purposed computing device, such as the XBOX 360® video game and entertainment system from MICROSOFT CORPORATION of Redmond, the PLAYSTATION®3 game console from SONY COMPUTER ENTERTAINMENT INC. of Tokyo, Japan, or the NINTENDO® WII™ game console from NINTENDO COMPANY LTD. of Kyoto, Japan. It will be appreciated that the game console 102 may represent any computing device executing a game program 104, including, but not limited to, a personal computer, a set-top box, a cell phone, or a hand-held gaming system.

A user 106 may interface with the game console 102 through a game controller 108. The game controller 108 may provide a number of buttons, keys, triggers, joysticks, trackballs, touchpads, accelerometers, and other input devices that the user 106 utilizes to interact with the game program 104 or any other software executing on the game console 102. The user 106 may further interface with the game console 102 using a headset 110. The headset 110 may allow the user to chat with other participants in online, multi-player games, for example. The online, multi-player games may be hosted on a multi-player gaming server 112 that is connected to the game console 102 via a network 114, such as the Internet. The multi-player gaming server 112 may be provided by an online game service, such as the XBOX LIVE® online game service from MICROSOFT CORPORATION.

It will be appreciated that the headset 110 depicted in FIG. 1 may be any audio input/output ("I/O") device known in the art, including, but not limited to, a microphone and a speaker attached to the game console 102. It will be further appreciated that the headset 110 may be utilized by the user 106 to access other audio features of a game program 104 executing on the game console 102 beyond the multi-player chat described above, including, but not limited to, voice commands to control aspect of gameplay or simulated communication within the context of the game scenario, such as communication with air traffic control in a flight simulator.

According to embodiments, when the user 106 is participating in a game program 104 executing on the game console 102, the console normally routes I/O from the headset 110 to the audio feature or features of the game program. For example, if the user is participating in a multi-player game hosted on the multi-player gaming server 112, the game console 102 will establish an in-band communication channel 116 between the headset 110 and the multi-player gaming server 112, as illustrated in FIG. 1, to facilitate the chat feature amongst the participants. The in-band communication channel 116 may utilize a voice over IP ("VoIP") connection established over the network 114 or some other protocol known in the art for two-way voice communication.

If the user 106 presses a designated button, such as the button 118, on the game controller 108 during gameplay, the game console 102 uses an internal switching mechanism 120 to switch connectivity of the headset 110 from the in-band communication channel 116 with the multi-player gaming server 112 or other audio feature of the game program 104 to an out-of-band communication channel 124 with a voice recognition engine 126A, 126B (collectively referred to herein as voice recognition engine 126). The internal switching mechanism may be implemented in the hardware of the game console 102 or may be implemented in the operating system 122 controlling game console. In one embodiment, the switching mechanism is provided by the game program 104 executing on the game console 102.

The voice recognition engine 126 is a hardware device or software module configured to receive voice commands from the headset 110 or other audio I/O device, utilize speech recognition technology to parse the command text from the voice command, and execute a function or functions associated with the command text, as will be described in more detail below in regard to FIG. 2. In one embodiment, the voice recognition engine 126 consists of an on-system voice recognition engine 126A implemented onboard the game console 102. In another embodiment, the voice recognition engine 126 consists of an off-system voice recognition engine 126B implemented in an external server or device and connected to the game console 102 via the network 114.

The choice of implementation may depend on a number of factors, including, but not limited to, the scope of the functions available via associated voice commands and the overall processing power of the game console 102. For example, functions related to media playback on the game console 102 itself may be better suited for the on-system voice recognition engine 126A. For voice commands requiring more processing power for recognition, such as searching online media by name or artist, the off-system voice recognition engine 126B may be the more appropriate choice. In a further embodiment, the voice recognition engine 126 may consist of a combination of both on-system and off-system components.

Once out-of-band connectivity between the headset 110 and the voice recognition engine 126 is established through the switching mechanism 120, the user may issue voice commands using the headset to the voice recognition engine. The voice recognition engine is able to receive the voice commands from the headset 110 and send aural responses to the headset without interrupting gameplay on the game console 102. In addition, any in-band communication channel 116 established between the headset 110 and the multi-player gaming server 112 or other audio feature may remain active. Once the processing of voice commands from the user is complete, the game console 102 can utilize the switching mechanism 120 to switch connectivity of the headset 110 back to the in-band communication channel 116 in order to continue using multi-player chat or other audio feature of the active game. Processing of voice commands may be determined to be complete when the user 106 issues a "quit" voice command, when the execution of the function associated with a particular voice command finishes, when enough silence is detected in the user's utterance to be considered an end of speech marker, or when the user releases the designated button 118 on the game controller 108, for example.

In order to execute the function or functions associated with each recognized voice command, the voice recognition engine 126 may have access to a variety of interactive voice response ("IVR") systems, communication networks, and other external services. In one embodiment, to facilitate out-of-band voice communication with a third party 128 during gameplay, the voice recognition engine 126 has access to a telephone network containing a telephone 130 of the third party. Upon receiving a voice command associated with establishing a third party telephone call, the voice recognition engine 126 may establish a communication link between the headset 110 on the game console 102 and the telephone 130 via the public switched telephone network ("PSTN"), or via the Internet utilizing VoIP technology, for example.

In another embodiment, the voice recognition engine 126 is connected to a voice portal service 132, such as that provided by TELLME NETWORKS INC. of Mountain View, Calif., in order to facilitate voice commands from the user 106 to retrieve information from the Internet. The voice portal services may allow the user 106 to search and download music or other media; access game hints; retrieve news, sports, weather or stock quotes; or find movies, showtimes and theaters, all using voice commands through the out-of-band communication channel 124 established by the game console 102 without interrupting gameplay. The voice recognition engine 126 may provide user specific information to the voice portal service 132, such as the user's profile, statistics, or information about the current game being played on the game console 102, in order to provide context for processing the voice commands of the user 106.

In other embodiments, the voice recognition engine 126 may be further connected to IVR systems, such as the IVR system 134, provided by individual vendors, allowing the user 106 to order pizza, access social networking functionality, or perform other functions using voice commands sent through the out-of-band communication channel 124, without interrupting gameplay on the game console 102. It will be appreciated that many other IVR systems and services could be imagined by one skilled in the art than those described herein with which the voice recognition engine 126 could have access in order to provide voice command-based services to the user 106. It is intended that this application include all such IVR systems and services.

In addition, the voice recognition engine 126 may have access to local functions provided by the game console 102, like media playback functions, in order to allow the user 106 to select the current music track which is being played in combination with the game audio, for example, without interrupting gameplay or the execution of the game program 104 on the console.

Figure 2:
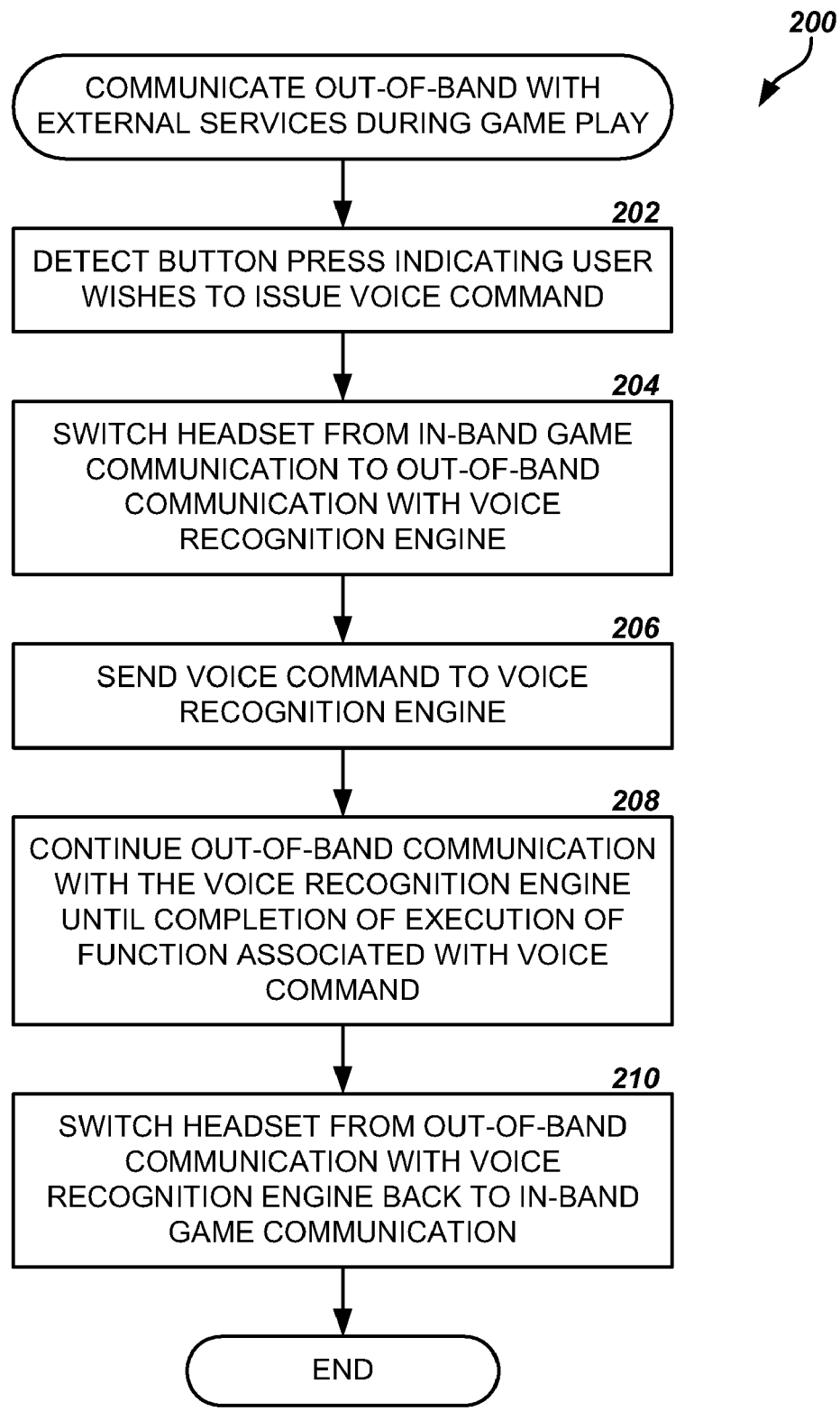
FIG. 2 is a flow diagram showing one method for providing out-of-band voice communication with interactive voice response services from a game console during gameplay, as provided in the embodiments described herein.

Referring now to FIG. 2, additional details will be provided regarding the embodiments presented herein. In particular, FIG. 2 illustrates a routine 200 for providing out-of-band voice communication with interactive voice response services from a game console during gameplay. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 begins at operation 202, where the game console 102 detects a button press on the game controller 108 or other signal from the user 106 indicating that the user wishes to issue a voice command. As described briefly above, any button, such as the button 118, or combination of buttons on the game controller 108 may be configured to invoke the out-of-band connection with the voice recognition engine. It will be appreciated that other methods beyond a button press on the game controller 108 could be used to indicate the user 106 wishes to issue a voice command, including, but not limited to, pressing a button on the headset 110 or uttering an attention word into the headset, such as "Computer." It is intended that this application include all such methods.

Once the button press or other signal is detected, the routine 200 moves from operation 202 to operation 204, where the game console 102 switches the headset connection from in-band game communication to out-of-band communication with the voice recognition engine 126. According to embodiments, this is accomplished using an internal switching mechanism 120 of the game console 102 without interrupting gameplay.

For example, the user 106 may be actively engaged in an in-band game communication through the headset 110, such as a multi-player chat hosted on the multi-player gaming server 112, when the user presses the button 118 on the game controller 108. The game console 102 detects the button press and establishes an out-of-band communication channel 124 with the voice recognition engine, either an on-system voice recognition engine 126A or an off-system voice recognition engine 126B, depending on the chosen implementation. The game console 102 then switches the headset I/O from the in-band communication channel 116 with the multi-player gaming server 112 to the out-of-band communication channel 124 with the voice recognition engine 126 using the switching mechanism 120.

In one embodiment, the in-band communication channel 116 is "kept alive" while communication between the headset and the voice recognition engine 126 is active, allowing the user 106 to return to the multi-player chat or other in-band game communication when the voice command processing is complete. In a further embodiment, once the headset connection is switched to out-of-band communication with the voice recognition engine 126, the voice recognition engine responds to the user 106 with a ready signal indicating that the voice recognition engine is ready to receive a voice command. For example, the voice recognition engine 126 may play a tone or speech such as "ready" to the headset 110 to indicate that the voice command can be spoken by the user 106. Alternatively, the voice recognition engine 126 may cause the game console 102 to overlay a status message on the game display indicating that the voice recognition engine is ready to receive a voice command.

From operation 204, the routine 200 proceeds to operation 206, where the voice recognition engine 126 receives the voice command from the user 106. For example, the user 106 may say "call Joe" into the headset 110 connected to the game console 102. Once the voice command is received, the routine 200 moves to operation 208, where the voice recognition engine 126 utilizes speech recognition technology to parse the command details from the voice command received. It will be appreciated that many speech recognition technologies commonly known in the art may be utilized to parse the voice command. According to one embodiment, the voice recognition engine 126 converts the voice command to a textual representation of the command before processing the command. In another embodiment, the voice command may be matched with pre-recorded voice commands for the current user 106 in order to identify the command desired.

In a further embodiment, a hybrid method may be utilized, where the voice recognition engine 126 uses speech-to-text conversion to recognize a root command in the voice command, and then matches the remaining portions of the voice command to pre-recorded elements. For example, if the user 106 issues the voice command "call Joe," the voice recognition engine 126 may parse the root command "call" from the voice command indicating that the user wishes to place a telephone call to a third party. The voice recognition engine 126 may then search a list of pre-recorded names of third parties to find the best match for the remaining element of the voice command, in other words "Joe." Similarly, if the user 106 issues the command "Play Smashing Pumpkins," the voice recognition engine 126 may recognize the root command "play" in the voice command indicating that the user 106 wishes to play media content on the game console 102. The voice recognition engine 126 may then search through the titles and artists of all media content accessible to the game console 102 in order to find content best matching the remaining element of the voice command "Smashing Pumpkins."

According to another embodiment, after recognizing the voice command, the voice recognition engine 126 may issue a confirmation to the user in order to verify the command parsed from the voice command. The voice recognition engine 126 may then wait for approval from the user 106 before proceeding to execute any function associated with the command. For example, if the users says "Call Joe," the voice recognition engine 126 may respond by playing the speech "Would you like to call Joe Thompson at home?" over the headset 110 before placing the call. The voice recognition engine 126 may wait for the user 106 to say "Yes" or "Ok" before establishing the telephone call to the identified third party. In a further example, the voice recognition engine 126 may cause the game console 102 to overlay a verification message on the game display and wait for an aural response from the headset or additional button press on the game controller 108 before proceeding.

The routine 200 then proceeds from operation 208 to operation 210 where the voice recognition engine 126 executes any function associated with the recognized voice command. For example, upon recognizing the command "call Joe," the voice recognition engine 126 may issue a command to a call control server over the network 114 to establish a telephone connection between the game console 102 and a telephone 130 at Joe's location. As discussed above, this may be accomplished using VoIP technology over the network 114, a traditional PSTN, a combination of the two, or some other communication technology or protocol known in the art. In order to establish the telephone connection, the voice recognition engine 126 must know the location or telephone number assigned to Joe. This may have been previously entered by the user 106 or may appear in an address book or some other data file associated with the user and available to the voice recognition engine 126.

In another embodiment, the voice recognition engine 126 simply connects the headset 110 through the out-of-band communication channel 124 to an external IVR system 134 to allow the user 106 to continue issuing voice commands to complete the function. For example, upon recognizing the command "what's the weather outside," the voice recognition engine 126 may establish an out-of-band communication channel between the headset 110 and a voice portal service 132, as described above in regard to FIG. 1. The voice recognition engine 126 may provide context information regarding the user 106 to the voice portal service 132 to allow the voice portal service determine the weather information for the user's location and respond to the user through the out-of-band communication channel and headset 110. However, if the voice portal service 132 requires more information, such as the user's location, then the voice portal service may allow the user 106 to further interact with the service using voice commands.

In a further example, upon recognizing the command "order pizza," the voice recognition engine 126 may connect the headset 110 through the out-of-band communication channel to an IVR system 134 operated by a pizza delivery company. The IVR system 134 may then use voice prompts and internal speech-recognition technologies to walk the user 106 through the process of ordering the pizza.

According to another embodiment, the voice recognition engine 126 may perform all the speech recognition required to execute the function associated with the command. For example, upon recognizing the command "get game hints," the voice recognition engine 126 may prompt the user 106 for additional information required for selecting game hints and then perform a query at a website containing the desired game hint data. Upon retrieving the data, the voice recognition engine 126 may convert the game hint data to speech and play the speech to the user 106 through the headset 110.

From operation 210, the routine 200 ends. As described briefly above, upon completion of a voice command, the game console 102 may restore the connection between the headset 110 and the in-band communication channel, allowing the user 106 to return to the audio feature of the game previously being utilized through the headset. In addition, the voice recognition engine 126 or a connected voice portal service 132 or IVR system 134 may monitor the progress of the execution of the function associated with the voice command and provide status messages to the user 106. For example, if a pizza is ordered by a voice command to the voice recognition engine 126 through an IVR system 134, the IVR system may cause the game console 102 to provide a status message as an overlay on the game display upon delivery of the pizza.

Figure 3:
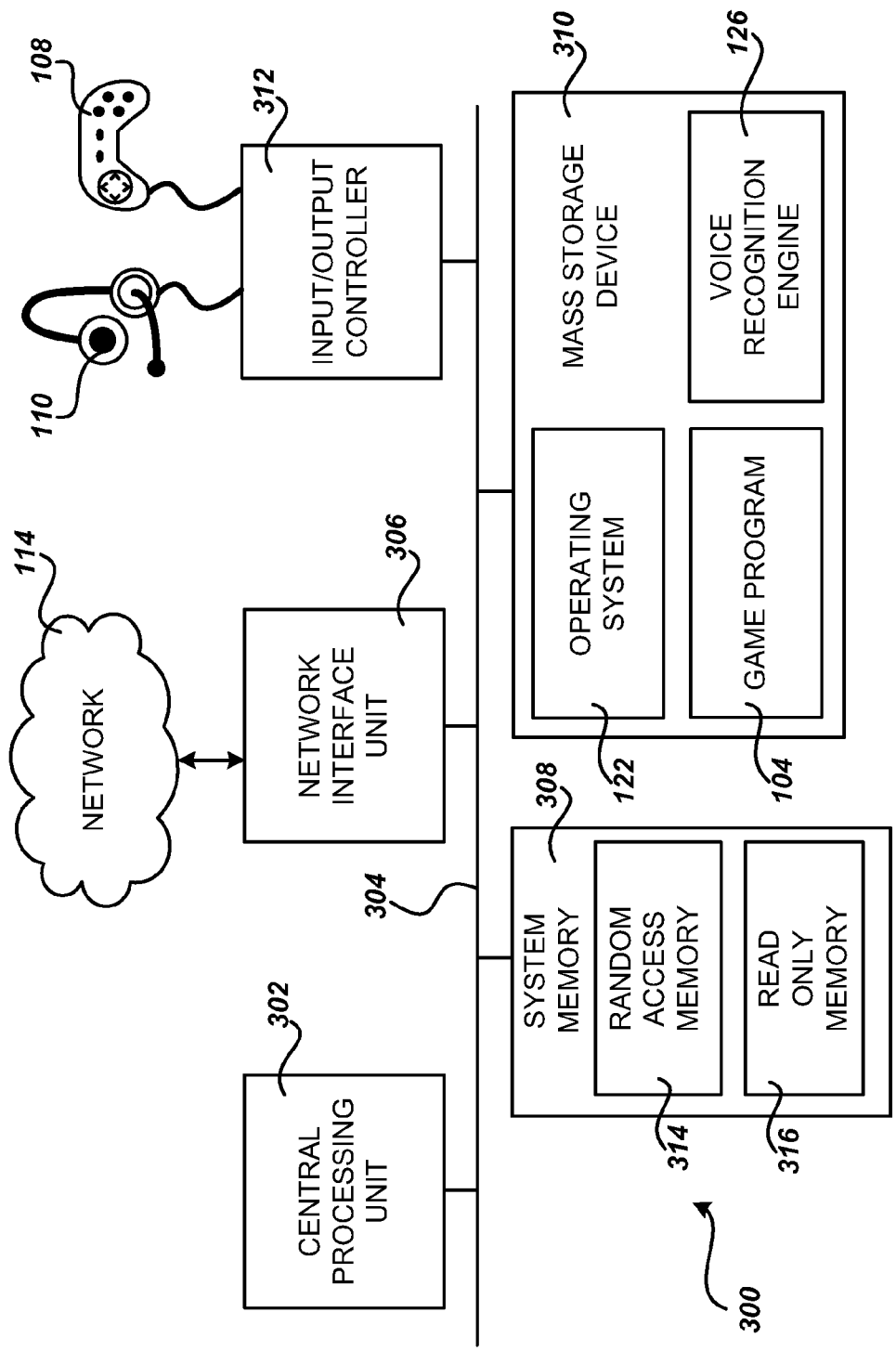
FIG. 3 is a block diagram showing illustrative computer hardware and software architectures for a computing system capable of implementing aspects of the embodiments presented herein.

FIG. 3 shows an example computer architecture for computers 300 capable of executing the software components described herein for providing out-of-band voice communication with interactive voice response services during gameplay, in the manner presented above. The computer architecture shown in FIG. 3 illustrates a conventional game console, desktop computer, laptop, or server computer and may be utilized to execute any aspects of the software components presented herein described as executing on the game console 102 or other computing platform.

The computer architecture shown in FIG. 3 includes a central processing unit 302 (CPU), a system memory 308, including a random access memory 314 (RAM) and a read-only memory 316 (ROM), and a system bus 304 that couples the memory to the CPU 302. A basic input/output system containing the basic routines that help to transfer information between elements within the computer 300, such as during startup, is stored in the ROM 316. The computer 300 also includes a mass storage device 310 for storing an operating system 318, application programs, and other program modules, which are described in greater detail herein.

The mass storage device 310 is connected to the CPU 302 through a mass storage controller (not shown) connected to the bus 304. The mass storage device 310 and its associated computer-readable media provide non-volatile storage for the computer 300. Although the description of computer-readable media contained herein refers to a mass storage device, such as a hard disk or CD-ROM drive, it should be appreciated by those skilled in the art that computer-readable media can be any available computer storage media that can be accessed by the computer 300.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 300.

According to various embodiments, the computer 300 may operate in a networked environment using logical connections to remote computers through a network such as the network 114. The computer 300 may connect to the network 114 through a network interface unit 306 connected to the bus 304. It should be appreciated that the network interface unit 306 may also be utilized to connect to other types of networks and remote computer systems. The computer 300 may also include an input/output controller 312 for receiving and processing input from a number of other devices, including the game controller 108, the headset 110, a keyboard, a mouse, or an electronic stylus (not shown in FIG. 3). Similarly, an input/output controller may provide output to a display, a printer, or other type of output device.

As mentioned briefly above, a number of program modules and data files may be stored in the mass storage device 310 and RAM 314 of the computer 300, including an operating system 122 suitable for controlling the operation of a game console, desktop, laptop, or server computer. The mass storage device 310 and RAM 314 may also store one or more program modules. In particular, the mass storage device 310 and the RAM 314 may store the on-system voice recognition engine 126A or a game program 104, each of which was described in detail above in regard to FIG. 1. The mass storage device 310 and the RAM 314 may also store other types of program modules or data.

Based on the foregoing, it should be appreciated that technologies for providing out-of-band voice communication with interactive voice response services during gameplay are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing out-of-band voice communication with external services during gameplay on a game console, the method comprising:
   detecting at the game console a signal from a user indicating the user wishes to issue a voice command;
   upon detecting the signal, switching via a switching mechanism in the game console a connection of an audio input/output ("I/O") device connected to the game console from an in-band game communication channel to an out-of-band communication channel established with a voice recognition engine; and
   forwarding the voice command from the audio I/O device to the voice recognition engine via the out-of-band communication channel for processing of the voice command by the voice recognition engine.

2. The method of claim 1, wherein the elements of detecting, switching, and forwarding are performed without interrupting an execution of a game program on the game console.

3. The method of claim 1, wherein the signal indicating the user wishes to issue a voice command comprises a button press of one or more buttons on a game controller attached to the game console.

4. The method of claim 1, wherein the audio I/O device comprises a headset connected to the game console.

5. The method of claim 1, wherein the voice recognition engine comprises a software module executing on the game console.

6. The method of claim 1, wherein the voice recognition engine comprises an external computer connected to the game console via a network.

7. The method of claim 1, wherein processing of the voice command comprises establishing a telephone connection between the audio I/O device attached to the game console and a telephone device located on a network via the out-of-band communication channel.

8. The method of claim 1, wherein processing of the voice command comprises establishing a connection between the audio I/O device attached to the game console and a voice portal service located on a network via the out-of-band communication channel.

9. The method of claim 1, wherein processing of the voice command comprises establishing a connection between the audio I/O device attached to the game console and an interactive voice response system located on a network via the out-of-band communication channel.

10. A computer readable storage medium that is not a signal, the computer readable storage medium having computer executable instructions stored thereon that, when executed by a computer, cause the computer to:
    detect a signal indicating a user of the computer wishes to issue a voice command;
    upon detecting the signal, switch a connection of an audio input/output ("I/O") device connected to the computer from an in-band game communication channel to an out-of-band communication channel established with a voice recognition engine; and
    forward the voice command from the audio I/O device to the voice recognition engine via the out-of-band communication channel for processing of the voice command by the voice recognition engine.

11. The computer readable storage medium of claim 10, wherein the computer performs the elements of detecting, switching, and forwarding without interrupting a game program executing on the computer.

12. The computer readable storage medium of claim 10, wherein the signal indicating the user wishes to issue a voice command comprises a button press of one or more buttons on a game controller attached to the computer.

13. The computer readable storage medium of claim 10, wherein the audio I/O device comprises a headset connected to the computer.

14. The computer readable storage medium of claim 10, wherein processing of the voice command comprises establishing a telephone connection between the audio I/O device attached to the computer and a telephone device located on a network via the out-of-band communication channel.

15. The computer readable storage medium of claim 10, wherein processing of the voice command comprises establishing a connection between the audio I/O device attached to the computer and one of a voice portal service and an interactive voice response system located on a network via the out-of-band communication channel.

16. A system for providing out-of-band voice communication with external services during gameplay, the system comprising:
    a game console having an attached audio input/output ("I/O") device and a switching mechanism, the game console operative to detect a signal indicating a user of the game console wishes to issue a voice command;

upon detecting the signal, utilize the switching mechanism to switch a connection of the audio I/O device from an in-band game communication channel to an out-of-band communication channel established with a voice recognition engine;

forward the voice command from the audio I/O device to the voice recognition engine via the out-of-band communication channel for processing of the voice command by the voice recognition engine; and upon completion of the processing of the voice command, utilizing the switching mechanism to switch the connection of the audio I/O device from the out-of-band communication channel to the in-band game communication channel.

17. The system of claim 16, wherein the game console is operative to detect the signal and switch the connection without interrupting a game program executing on the game console.

18. The system of claim 16, wherein the voice recognition engine comprises a software module executing on the game console.

19. The system of claim 16, wherein the voice recognition engine comprises an external computer connected to the game console via a network.

20. The system of claim 16, wherein the game console is further operative to keep the in-band game communication channel alive during the switching of the connection of the audio I/O device and the processing of the voice command.

* * * * *